(12) United States Patent
Grinderslev

(10) Patent No.: US 9,989,708 B1
(45) Date of Patent: Jun. 5, 2018

(54) CONNECTOR WITH LATERAL AND ANGULAR TOLERANCE

(71) Applicant: TE Connectivity Corporation, Berwyn, PA (US)

(72) Inventor: Soren Grinderslev, Hummelstown, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days. days.

(21) Appl. No.: 15/449,522

(22) Filed: Mar. 3, 2017

(51) Int. Cl.
*G02B 6/36* (2006.01)
*G02B 6/38* (2006.01)

(52) U.S. Cl.
CPC ......... *G02B 6/3818* (2013.01); *G02B 6/3853* (2013.01); *G02B 6/3875* (2013.01)

(58) Field of Classification Search
CPC ... G02B 6/3818; G02B 6/3878; G02B 6/3853
See application file for complete search history.

(56) References Cited

U.S. PATENT DOCUMENTS

| | | | | |
|---|---|---|---|---|
| 3,947,182 A | * | 3/1976 | McCartney | G02B 6/3869 385/54 |
| 9,213,147 B2 | * | 12/2015 | Mitchell | G02B 6/3833 |
| 2002/0186931 A1 | * | 12/2002 | Seo | G02B 6/125 385/45 |
| 2017/0052326 A1 | * | 2/2017 | Grinderslev | G02B 6/3846 |

* cited by examiner

*Primary Examiner* — Sung Pak

(57) ABSTRACT

A connector having a front and rear origination and configured to mate with a mating connector, said connector comprising a ferrule defining at least one borehole for receiving a fiber, and having a second diameter less than the opening of the housing through which it extends such that a gap is defined between said ferrule and said orifice to allow said ferrule to move within said orifice angularly and laterally with respect to said axis. A sleeve containing a lens is disposed around a portion of said ferrule forward of the opening of the housing and extends beyond the front end of the ferrule.

18 Claims, 5 Drawing Sheets

CONNECTOR WITH LATERAL AND ANGULAR TOLERANCE

FIELD OF INVENTION

The invention relates generally to fiber-optic systems. More specifically, the invention relates to a multi-ferrule connector having lateral and angular tolerance.

BACKGROUND

Today's increasing demand for more signal speed and bandwidth has stimulated the transition from copper to fiber as the preferred means for the data transfer. A common perception is that this transition can be solved by simply replacing the copper cables with a fiber system. However, such as conversion faces significant technical challenges. For example, not only must the fiber termini physically fit within the same form factor as the electrical contacts, but when dealing with fibers, and, in particular, the nine (9) micron single mode (SM) fiber core, much tighter tolerances are required than those sufficient for copper contact operation. For instances, copper connectors allow the copper contacts to bend during the mating engagement whereas the fiber termini have limited allowance for such a deformation. The reason is that copper contacts need to make only a physical contact (anywhere over the wipe distance) to operate, while the fiber termini requires a precise mechanical axial alignment of the small fiber cores.

For optical operation in a vibrational and dusty environment it is often preferred to use a non-contacting lensed expanded beam (EB) terminus over a physical contact (PC) fiber connection as it provides a more reliable performance under harsh conditions. However, the tight alignment requirements mentioned above still apply. For example, the circular MIL-38999 connector, which originally was designed for copper contacts, and was standardized in the MIL-DTL-38999L document. This widely used industrial connector allows a lateral misalignment of the plug to receptacle cavities of up to 0.50 mm [0.0195 inch] for worst case. While this is acceptable for electrical contacts, such a misalignment will cause serious mating problems for the fiber termini. This can result in termini damage due to stubbing and will most often create unacceptable loss levels.

Typically, the effect of mating fiber termini with lateral misalignment will translate into an angular tilt between the pin and the socket and is one of the largest loss contributors for optical fibers. The effects on single mode (SM) expanded beam (EB) connectors are particularly deleterious. FIG. 1 shows a sensitivity graph of the modeled loss addition caused by angular tilt between an EB SM pin and socket. For example, referring to FIG. 2, a SM EB pin terminus 201 which is about 20 mm long including the crimp eyelet is mated to a SM EB socket 202. If its end is tilted 70 microns (or 0.20 degrees) relative to the SM EB socket axis, the modeling shows that a loss of approximately 1.0 dB is incurred. A slight increase of the angle from 0.20 degrees to 0.25 degrees tilt causes the loss to jump to 1.6 dB.

One approach for accommodating angular offset in SM connectors is disclosed for in U.S. Pat. No. 9,213,147. This patent applies only to physical contact connectors and discloses a specially configured ferrule that narrows as it passes through the orifice of the housing to accommodate angular movement. Applicant recognizes several shortcomings in such a configuration, including, for example, compromised strength in the narrow portion of the ferrule, and the need to produce/machine custom ferrule components which can be prohibitively expensive.

Accordingly, Applicant has identified the need for an SM connector expanded beam (EB) design that will compensate for angular tilt and lateral offset without the preparation of exotic and complicated parts. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The above-identified problem is avoided by disposing the sleeve on the ferrule forward of the connector housing such that a gap is defined between the ferrule and the connector housing at the orifice through which the ferrule extends from the connector housing. The gap is roughly the size of the sleeve which conventionally is disposed around the ferrule in the orifice. The gap is sufficient to allow the ferrule to move within the orifice angularly and laterally with respect to the housing.

In one embodiment, the invention relates to a connector comprising a housing having one or more cavities defined therein, and a front face with one or more orifices defined therein. Each of the cavities has an axis. Each of the orifices corresponds to one of the cavities and has an inner first diameter. The connector also comprises an optical contact at least partially disposed in one of the cavities. The optical contact comprises at least a ferrule extending from the cavity through the orifice, and defining at least one borehole for receiving a fiber (not shown). The ferrule has a constant outside second diameter along its length. The second diameter is less than the first diameter such that a gap is defined between the ferrule and the inner first diameter of the orifice to allow the ferrule to move within the orifice angularly and laterally with respect to the axis. The connector also comprises a ferrule holder having a front end connected to the ferrule behind the orifice. A sleeve is disposed around a portion the ferrule and extends from a point forward of the orifice to beyond a front end of the ferrule. A lens, for example, a ball lens, is disposed at least partially in the sleeve and forward of the front face. In one embodiment, the lens contacts the fiber in the ferrule.

In another embodiment, the present invention relates to a connector system comprising, for example, two connectors as defined above, and an outer sleeve, wherein a portion of the sleeve of each connector is disposed in the outer sleeve such that the lens of each connector are optically coupled.

DETAILED DESCRIPTION

Figure 4:
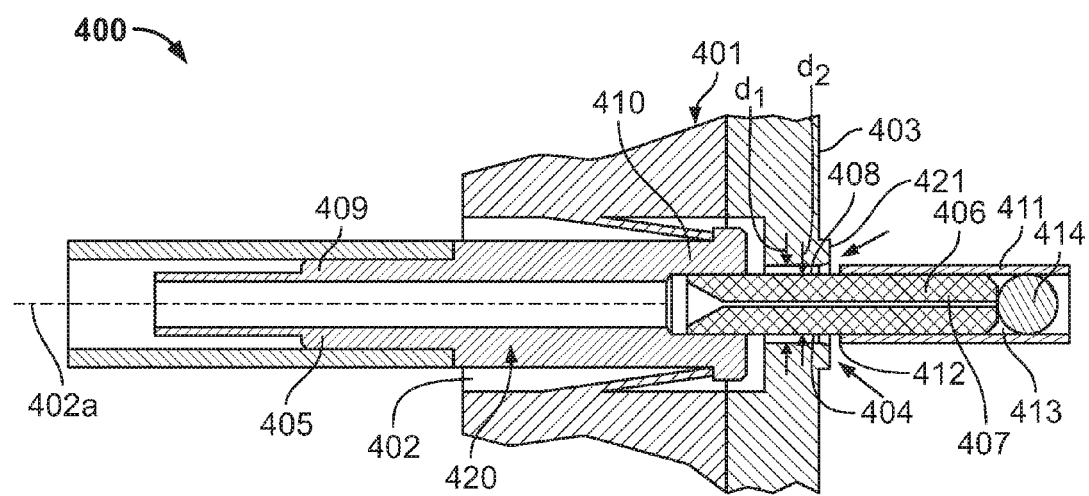
FIG. 4 shows one embodiment of the connector of the present invention.

Referring to FIG. 4, one embodiment of a connector 400 of the present invention is shown. The connector 400 has a front and rear origination, and is configured to mate with a mating connector (not shown). The connector comprises a housing 401 having one or more cavities 402 defined therein, and a front face 403 with one or more orifices 404 defined therein. Each of the cavities 402 has an axis 402a. Each of the orifices 404 corresponds to one of the cavities and has an inner first diameter d1. The connector 400 also comprises an optical contact 405 at least partially disposed in one of the cavities 402. The optical contact 405 comprises at least a ferrule 406 extending from the cavity 402 through the orifice 404, and defining at least one borehole 407 for receiving a fiber (not shown). The ferrule has a constant outside second diameter d2 along its length. The second diameter d2 is less than the first diameter d1 such that a gap 408 is defined between the ferrule 406 and the inner first diameter of the orifice 404 to allow the ferrule to move within the orifice angularly and laterally with respect to the axis. The connector also comprises a ferrule holder 409 having a front end 410 connected to the ferrule behind the orifice. A sleeve 411 is disposed around a portion the ferrule 406 and extends from a point 412 forward of the orifice 404 to beyond a front end 413 of the ferrule. A lens 414, for example a ball lens, is disposed at least partially in the sleeve 411 and forward of the front face 403. In one embodiment, the lens 414 contacts the fiber in the ferrule.

These elements are considered in greater detail below in connection with selected alternative embodiments.

Throughout this description, a MIL-38999 connector is illustrated. However, it should be understood that the claims apply to any connector that accommodates a mateable pin and sockets style connection. For some of these connectors, the cavity dimensions and tolerances are defined and restricted by industrial Standards and for use with those connectors it is important that the contacts are designed to function in their respective cavities and orifices.

An important aspect of the present invention is the tolerance between optical contact and the housing to accommodate axial and lateral misalignment of the optical contact. This tolerance can be provided in different ways. In one embodiment, the axial and lateral accommodation of the optical contact and the housing 401 is achieved by a gap 408 between the outside of the orifice 404 as defined in the front face 403. As shown in the embodiment of FIG. 4, this gap is defined between the first diameter d1, and the second diameter d2. The gap 408 can vary according to application, although, preferably, it is at least as wide as the thickness of the sleeve 411 such that the optical contact can be assembled first, and then pushed through the orifice 404 during assembly of the connector.

Figure 1:
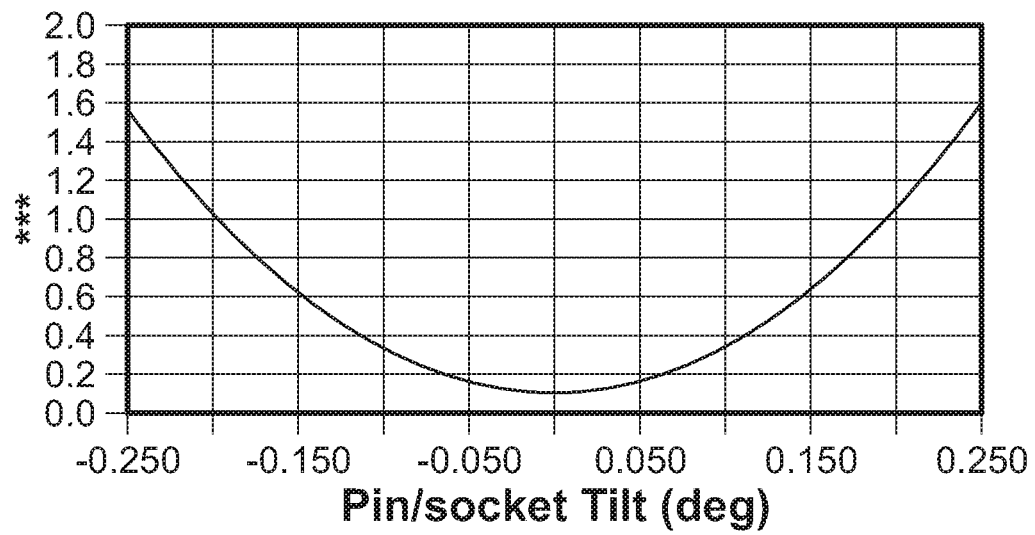
FIG. 1 shows optical loss as a function of angular misalignment of mating EB connectors.
Figure 2:
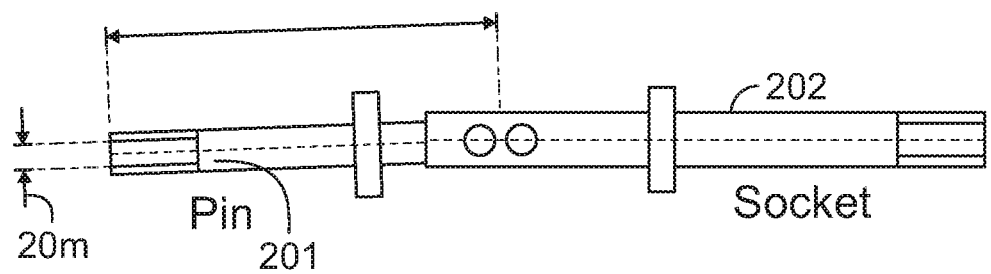
FIG. 2 shows a schematic of an EB pin and socket connector with angular misalignment.
Figure 3A:
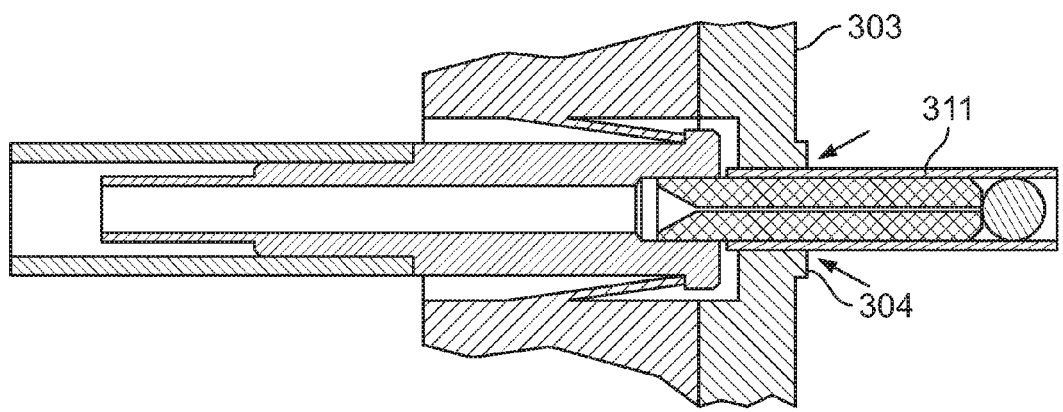
FIGS. 3a-3c show a traditional EB connector (FIG. 3a) compared to one embodiment of a connector modified in accordance with the present invention to accommodate lateral misalignment (FIG. 3b) and angular misalignment (FIG. 3c).
Figure 3B:
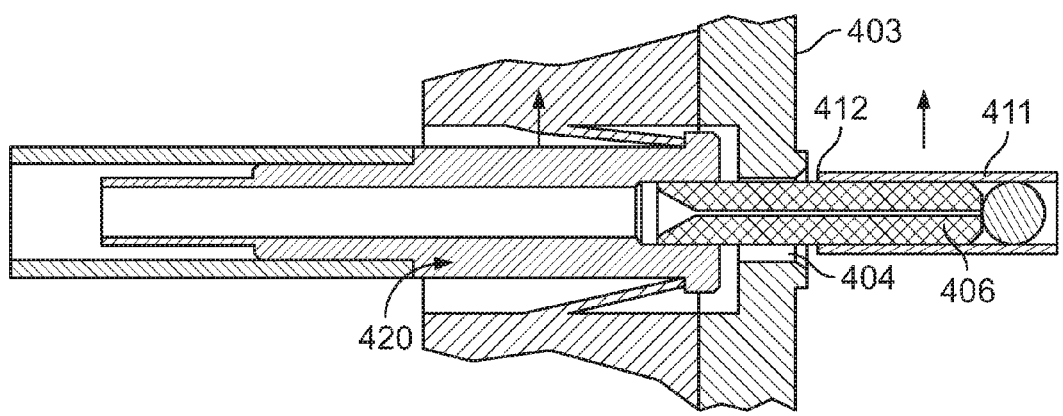
Figure 3C:
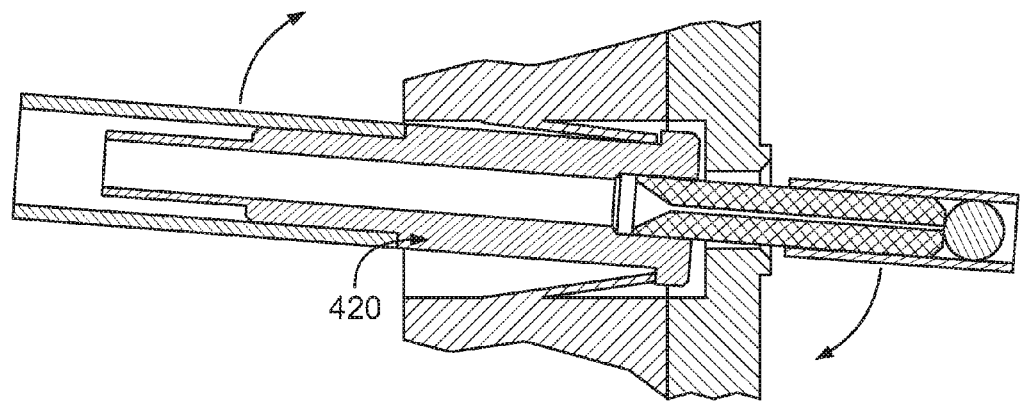

The functionality of the gap 408 is illustrated in FIGS. 3a-3c. FIG. 3a shows a prior art connector in which there is essentially no gap between the sleeve 311 and the front face 303 through the orifice 304 a as indicated by the arrows. Because there is no gap between the sleeve 311 and the front face 303 through the orifice 304, there is very little, if any, accommodation for lateral misalignment or axial misalignment.

Conversely, referring to FIGS. 3b and 3c, the lateral and axial accommodation of the optical contact in the housing is shown respectively. Specifically, with respect to FIG. 3b, the optical contact 420 is moved laterally until the ferrule 406 contacts the top portion of the inner diameter of the orifice 404. Likewise, the gap 408 (as shown in FIG. 4) can accommodate axial misalignment as shown in FIG. 3c. In that figure, the optical contact 420 is angled slightly clockwise with respect to housing. The gap 408 can be configured to accommodate the required degree of angular misalignment or lateral offset.

The degree of lateral and angular offset that can be accommodated is dictated by a number of features, including, the gap 408—i.e., the distance between d1 and d2 as shown in FIG. 4. Although the first diameter d1 of the orifice can vary according to the application, in one embodiment, it is essentially the same as a standard connector, thereby reducing inventory requirements and avoiding the need to retool. In such an embodiment, the gap 408 is achieved by reducing the outer diameter d2 of the optical contact. Although this can be achieved by reducing the diameter of the ferrule, generally, although not necessarily, such a configuration is not preferred because it tends to weaken the ferrule assembly. Rather, in one embodiment, the outer dimeter d2 is reduced by shortening the sleeve 411 such that it does not extend into the orifice 404. In other words, the sleeve extends from a point 412 in front of the front face 403 to beyond the ferrule as shown in FIG. 3. The point is sufficiently forward of the orifice such that the sleeve does not contact the front face when the optical contact is laterally misaligned as shown in FIG. 3b, or angularly misaligned relative to the axis 402a as shown in FIG. 3c.

Figure 7:
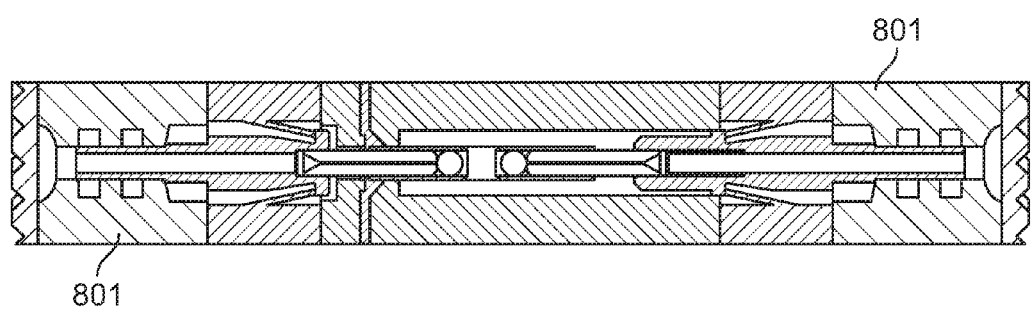
FIG. 7 shows a prior art connector configuration having a rubber grommet supporting the rear end of each optical contact.

The extent of the flexibility as illustrated in FIGS. 3b and 3c tends to be limited by the centering forces exerted by the resilient rear grommet and the interfacial "cork & bottle" sealing mechanism as shown in FIG. 7. When using the short sleeve lens holder design, the effects from the rear grommet 801 has proven to be beneficial initially in limiting the amount of tilt or offset which, if excessive, can lead to mating difficulties. But once the mating process has begun and the optical contact is inside the mating sleeve of an offset socket, the forces from the grommet will attempt to counteract any alignment efforts between the pin and the socket.

Figure 5A:
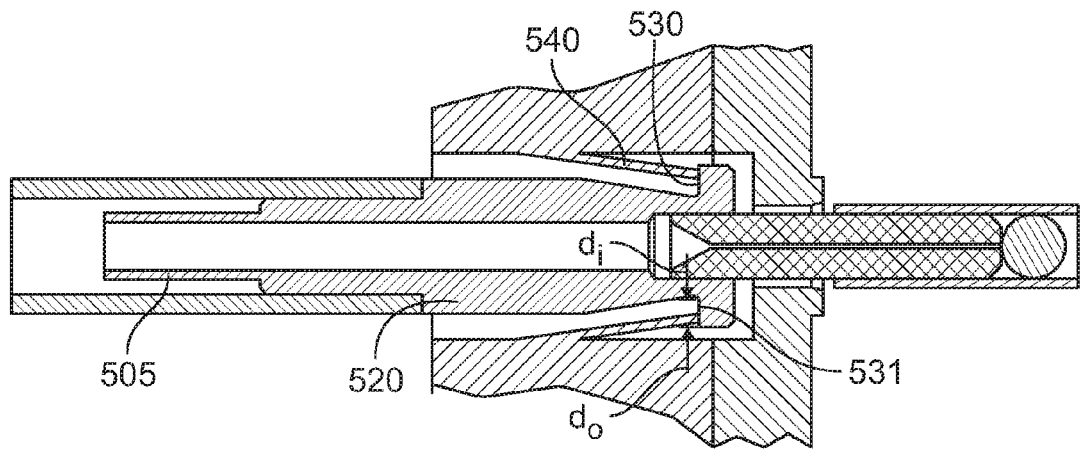
FIGS. 5a and 5b show another embodiment of the connector of the present invention.
Figure 5B:
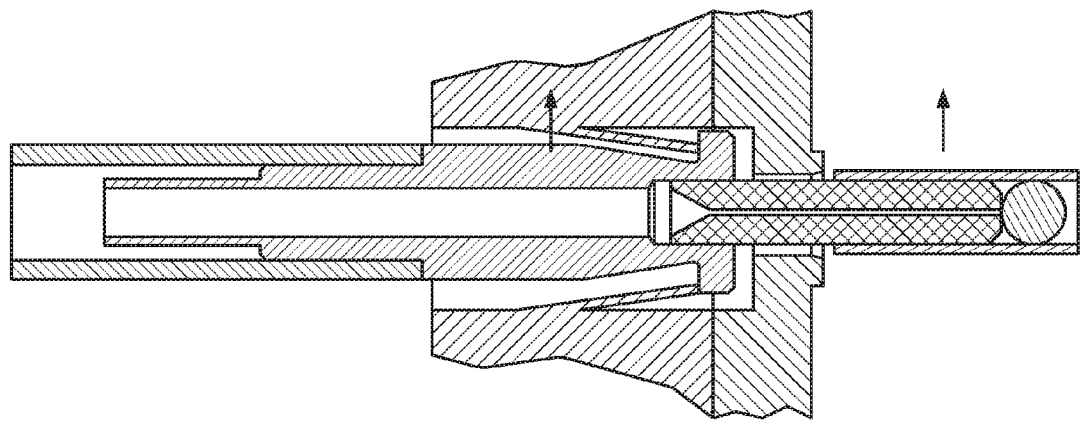
Figure 6:
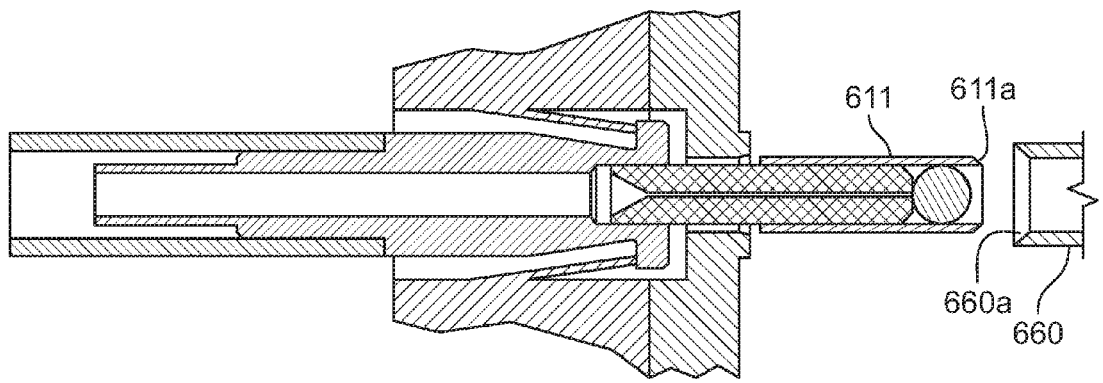
FIG. 6 shows another embodiment of the connector of the present invention.

In one embodiment, the invention also accommodates lateral and angular misalignment of the optical contact by providing an optical contact with a wide shoulder 530 to accommodate the lateral movement of resilient members 540 across the shoulder 530 during angular and lateral misalignment as shown in FIGS. 5a and 5b. By way of background, one effect of the resilient fingers is to center the optical contact in its cavity. Typically, each retainer mechanism can have anywhere from 2 to 6 fingers in a circular arrangement applying a symmetrical force onto the pin barrel. Therefore, depending on the number of fingers, their material and their flexibility, they will resist the natural alignment conformance of the optical contact with an offset socket. This is illustrated in FIGS. 3a and 3b where the fingers on one side are more deflected than on the opposed side. The resistance force will be proportional with the amount of deflection.

By adding a clearance on the shoulder 530 for the resilient fingers (beyond their reach) will ease the ability of the optical contact to float into alignment with the socket as illustrated in FIGS. 5a and 5b. Specifically, referring to FIGS. 5a and 5b, the optical contact 520 shown is a slightly modified version of the optical contact 420 shown in FIG. 4. Specifically, the ferrule holder 505 is modified to widen the shoulder 530 against which resilient members 540 urge to bias the optical contact 520 forward and center in the housing. In this embodiment, the shoulder 530 defines an annular surface 531 having an inside diameter di and an outside diameter do thus defining the width of the annular surface. (It should be understood that while the FIG. 4 illustrates the ferrule and the ferrule holder as discrete components, they may be integrated. Likewise, the shoulder 530 can be made from various, discrete metals/materials or it can be molded as an integral part of the optical contact.) It should be noted that the width of the annular surface in this embodiment is wider than that of a standard connector. The wider surface allows the resilient members 540 to slide across the annular surface as the optical contact is laterally or angularly offset. For example, as shown in FIG. 5b in which the optical contact 520 is urged upward, the top and bottom resilient members 540 (as orientated in the figure) slide from the center of the annular surface to the inside diameter di and outside diameter do, respectively. The width of the annular surface is a matter of design preference.

To further accommodate angular and lateral misalignment of the optical contact, the front face has a chamfer 421 around the orifice 404 to allow for annular misalignment of the optical contact in the cavity. Likewise, to accommodate mating of an angularly offset optical contact with the outer sleeve 660, the leading edge of the sleeve 611a is chamfered. A chamfer on the front edge of the sleeve 661 will provide better guidance and reduce the interferences that can occur during the initial pin/socket alignment. The mating process can be further improved if also a lead-in chamfer 660a is added to the receiving alignment/outer sleeve 660.

In one embodiment, the gap and the shoulder facilitate at least 5° angular movement of the optical contact relative to the axis 402a, and in a more particular embodiment, at least 8° angular movement. In one embodiment, the gap and the shoulder facilitate at least 200 µm micron lateral movement of the optical contact from the axis, and in a more particular embodiment, at least 300 µm microns lateral movement from the axis.

In addition to the features to accommodate lateral and angular misalignment as described above, the connector of the present invention may also have other traditional features found in other optical connectors. For example, in one embodiment, the lens 414 comprises a ball lens. In one embodiment, the ball lens contacts the ferrule fiber as shown in FIG. 4.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A connector having a front and rear origination and configured to mate with a mating connector, said connector comprising:
    a housing having one or more cavities defined therein, and having a front face with one or more orifices defined therein, wherein each of said cavities has an axis, wherein each of said orifices corresponds to one of said cavities and has an inner first diameter;
    an optical contact at least partially disposed in one of said cavities, and comprising at least,
        a ferrule extending from said cavity and through the orifice corresponding to said cavity, said ferrule defining at least one borehole for receiving a fiber, and having a second diameter less than said first diameter such that a gap is defined between said ferrule and said orifice to allow said ferrule to move within said orifice angularly and laterally with respect to said axis, said second diameter being constant along the length of said ferrule;
        a ferrule holder having a front end connected to said ferrule behind said orifice;
        a sleeve disposed around a portion of said ferrule, said sleeve disposed in front of said front face and extending from a point forward of said orifice to beyond said front end of said ferrule; and
        a lens disposed at least partially in said sleeve and forward of said front face.

2. The connector of claim 1, further comprising at least one fiber disposed in said borehole.

3. The connector of claim 1, wherein said ferrule holder defines a rearward facing shoulder and wherein said housing comprises a plurality of complaint finger having distal free ends that extend inwardly into said cavity and contact said shoulder so as to resist rearward movement of said ferrule holder and to compliantly align said optical contact axially with said axis.

4. The connector of claim 3, wherein said shoulder comprises an annular surface essentially perpendicular to said borehole, said annular surface defining a band width from its inside perimeter to its outside perimeter, wherein said band width is sufficiently wide such that said distal ends move along said band width as said optical contact is moved laterally or angularly relative to said axis.

5. The connector of claim 4, wherein, when said optical contact is axially aligned with said axis, each of said distal ends contacts said annular surface essentially in the middle of said band width such that each distal end is able to slide inwardly and outwardly as said optical contact is moved laterally and angularly relative to said axis.

6. The connector of claim 1, wherein said point is sufficiently forward of said orifice such that said sleeve cannot contact said front face when said optical contact is angularly misaligned relative to said axis.

7. The connector of claim 1, wherein said first diameter of said orifice is about the same as the outer diameter of said sleeve.

8. The connector of claim 1, wherein said front face has a chamfer around the orifice to allow for annular misalignment of the optical contact in said cavity.

9. The connector of claim 1, wherein said gap facilitates at least 5° angular movement of said optical contact from said axis.

10. The connector of claim 1, wherein said gap and said band width facilitate at least 200 µm lateral movement of said optical contact from said axis.

11. The connector of claim 1, wherein said lens is a ball lens.

12. The connector of claim 11, wherein said ball lens contacts said fiber.

13. The connector of claim 1, wherein said sleeve has a front edge which is chamfered.

14. The connector of claim 1, further comprising an outer sleeve configured to receive said sleeve.

15. The connector of claim 14, wherein said front edge of said sleeve and both ends of said outer sleeve are chamfered.

16. The connector of claim 1, wherein said ferrule and said ferrule holder are discrete components.

17. A connector system comprising:
at least two connectors;
and an outer sleeve connecting said two connectors;
wherein each connector of said at least two connectors having a front and rear origination and configured to mate with a mating connector, each connector comprising at least:
a housing having one or more cavities defined therein, and having a front face with one or more orifices defined therein, wherein each of said cavities has an axis, wherein each of said orifices corresponds to one of said cavities and has an inner first diameter;
an optical contact at least partially disposed in one of said cavities, and comprising at least,
a ferrule extending from said cavity and through the orifice corresponding to said cavity, said ferrule defining at least one borehole for receiving a fiber, and having a second diameter less than said first diameter such that a gap is defined between said ferrule and said orifice to allow said ferrule to move within said orifice angularly and laterally with respect to said axis, said second diameter being constant along the length of said ferrule;
a ferrule holder having a front end connected to said ferrule behind said orifice;
a sleeve disposed around a portion of said ferrule, said sleeve disposed in front of said front face and extending from a point forward of said orifice to beyond said front end of said ferrule; and
a lens disposed at least partially in said sleeve and forward of said front face; and
wherein a portion of said sleeve of each connector is disposed in said outer sleeve such that said lens of each connector are optically coupled.

18. The connector system of claim 17, wherein said outer sleeve is chamfered.

* * * * *